(12) United States Patent
Yoshida et al.

(10) Patent No.: US 7,487,879 B2
(45) Date of Patent: Feb. 10, 2009

(54) FUEL FILLER CAP

(75) Inventors: Hiromitsu Yoshida, Soja (JP); Takami Ono, Soja (JP)

(73) Assignee: Asteer Co., Ltd., Okayama (JP)

( * ) Notice: Subject to any disclaimer, the term of this patent is extended or adjusted under 35 U.S.C. 154(b) by 677 days.

(21) Appl. No.: 11/121,565

(22) Filed: May 4, 2005

(65) Prior Publication Data

US 2005/0263526 A1 Dec. 1, 2005

(30) Foreign Application Priority Data

May 28, 2004 (JP) .............................. 2004-160174

(51) Int. Cl.
 *B65D 53/00* (2006.01)
(52) U.S. Cl. ................. 220/304; 220/288; 220/293; 220/301; 220/323; 220/DIG. 33
(58) Field of Classification Search ........... 220/253, 220/288, 293, 301, 304, 232, DIG. 33
See application file for complete search history.

(56) References Cited

U.S. PATENT DOCUMENTS

2004/0239049 A1* 12/2004 Hagano et al. .............. 277/628

FOREIGN PATENT DOCUMENTS

| JP | 58-7538 | 2/1983 |
|---|---|---|
| JP | 63-20218 | 1/1988 |
| JP | 5-85425 | 12/1993 |
| JP | 2510168 | 6/1996 |
| JP | 3075255 | 8/2000 |
| JP | 2003-104418 | 4/2003 |
| JP | 2003-160160 | 6/2003 |

\* cited by examiner

*Primary Examiner*—Anthony D Stashick
*Assistant Examiner*—Elizabeth Volz
(74) *Attorney, Agent, or Firm*—William L. Androlia; H. Henry Koda

(57) ABSTRACT

This invention provides a fuel filler cap that can release an outer cap from an inner cap without influences of direction of the external force when it applied. The fuel filler cap 1 comprises the outer cap 11 constructed by an upper face portion 112, a skirt portion 113 extending from the outer circumference of the upper face portion 112 and a plurality of wedge-shaped projection 111 formed on the inner face of the skirt portion 113, the pressing plate 15, and the inner cap 13 constructed by a supporting plate 14 having annular slants 142 formed downward by chamfering the peripheral edge of its upper face intermittently, a seal ring 12 and a plurality of annular groove 146 defined by the individual annular slants 142 of the supporting plate 14 and by the lower face of the pressing plate 15 laid over the supporting plate 14.

10 Claims, 15 Drawing Sheets

FUEL FILLER CAP

BACKGROUND OF THE INVENTION

1. Field of the Invention

The present invention relates to a fuel filler cap for closing the filler port of an automobile.

2. Description of the Related Art

The fuel filler cap is desired to exhibit a stable gastightness when it is closed. Particularly, the fuel filler cap is required not to release its closed state accidentally even where either a direct external force or an external force resulting from a deformation of a car body applied. In the prior art, therefore, there has been proposed the fuel filler caps, which includes an inner cap to be fitted in the filler port and an outer cap to cover the filler port and to thereby perform a turning operation of the fuel filler cap. In these fuel filler caps including the inner cap and the outer cap, it is adopted construction to secure gastightness in that the outer cap is released from the inner cap while leaving the inner cap in its closed state in the filler port where the external force applied thereto.

For example, the fuel filler caps disclosed in JP-B-58-007538, JP-B-05-085425 and Japanese Patent No. 2,510,168 have adopted the aforementioned releasing construction under concern of the case in that the external force is applied upwardly to force the outer cap open by an imperfection based on the operator's handling and by a deformation of the car body generated.

On the contrary, the fuel filler caps disclosed in JP-A-63-020218, Japanese Patent No. 3,075,255 and JP-A-2003-104418 have adopted the aforementioned releasing construction under concern of the cases in that the external force is applied to the fuel filler cap in a transverse or upward direction. On the other hand, the fuel filler caps disclosed in JP-A-2003-104418 and JP-A-2003-160160 have adopted the construction, in which an outer circumference pipe having an outer cap protecting function is released from the outer cap to prevent the inner cap pushed into the filler port when the external force is applied downward to the fuel filler cap.

In this respect, the fuel filler caps disclosed in JP-A-63-020218 and Japanese Patent No. 3,075,255 has a structure, in which the outer cap is released when a part of supporting the outer cap to the inner cap is partially broken. This makes it impossible to mount the released outer cap again on the inner cap. Thus, the entire fuel filler cap has to be replaced once the outer cap is released. Moreover, the fuel filler caps disclosed in JP-A-2003-104418 and JP-A-2003-160160 require a large member, e.g., a side wall defined in the references, that can resist against the external force, as its element. As a result, problems arise to increase the number of members and/or to make a size of the fuel filler cap larger.

Thus, the inventors have made investigations to develop a fuel filler cap having a construction, firstly, in that the outer cap is released from the inner cap where an external force that damages the gastightness of the cap is applied from any directions and, secondly, a construction in that the released outer cap, or the released parts can be reused.

SUMMARY OF THE INVENTION

As a result of the investigations, the inventors have developed a fuel filler cap comprising: an inner cap of a substantially cylindrical member; and an outer cap of a cover member mounted on the inner cap: wherein the outer cap includes an upper face portion having a circular shape, a skirt portion integrally extending downward from an outer circumference of the upper face portion, and a plurality of a wedge-shaped projection having a triangular section formed circumferentially intermittently on an inner face of the skirt portion; wherein a pressing plate is a member having a circular shape, as viewed in a top plan, and having a smaller diameter than the internal diameter of the skirt portion; wherein the inner cap includes a supporting plate having a circular shape, as viewed in a top plan, and having at least the number of annular slants formed radially downward and obtained by chamfering a peripheral edge of an upper face thereof intermittently in a positional relation corresponding to the wedge-shaped projections, a seal ring fitted between a lower face of the supporting plate and an outer face of an inner cap body, and a plurality of an annular groove defined by the annular slants of the supporting plate and by a lower face of the pressing plate laid over the supporting plate; wherein the pressing plate and the supporting plate are provided with a plate engagement means for turning integrally in an opening/closing direction of the fuel filler cap and for releasing an engaged state of the pressing plate with the supporting plate when a releasing load is applied upward to the pressing plate; and wherein the wedge-shaped projections are engaged with the annular grooves correspondingly so that the outer cap and the inner cap are turned integrally in an opening/closing direction of the fuel filler cap.

Here, the individual annular grooves are defined by the annular slants of the supporting plate and by the pressing plate so that the fuel filler cap of the invention can also be constructed in the following manner. That is, it is also able to provide that the fuel filler cap according to the aforementioned fuel filler cap comprises the pressing plate having a circular shape in a top plan view and includes a plurality of engagement block protruding downward and formed intermittently in a circumferential direction so as to contact in a face-to-face relation with the annular slant formed when it is engaged with the supporting plate, and the inner cap includes a supporting plate having an annular slant continuously formed radially outward by chamfering the peripheral edge of the upper face, a seal ring fitted between the lower face of the supporting plate and the outer face of the inner cap body, and a plurality of the annular groove defined by the annular slant of the supporting plate and by a lower face of the pressing plate engaged with the supporting plate as lacks the engagement blocks.

In the fuel filler cap of the present invention, the outer cap is mounted on the inner cap by fitting a plurality of the wedge-shaped projection formed on the inner face of the skirt portion of the outer cap, individually in the annular grooves formed in the inner cap. The specific annular grooves and the wedge-shaped projections are preferred to have the following structures.

The annular grooves are individually formed either by closing the annular slants formed intermittently in the circumferential direction on the peripheral edge of the upper face of the supporting plate with the flat pressing plate or by closing the annular slant formed continuously in the circumferential direction on the peripheral edge of the upper face with the pressing plate having the engagement blocks arranged intermittently in the circumferential direction. These annular grooves have such a triangular shape as is determined by the sloping angle and width of the radially outward annular slant formed on the supporting plate and by the outer shape and size of the pressing plate with respect to the supporting plate. The sloping angle of the annular slant may be acute. It is also preferred that the individual annular grooves are arranged with regular intervals in the circumferential direction with the equal size in the annular grooves.

The wedge-shaped projections may be fitted in the individual annular grooves. For example, the wedge-shaped projections may have either a sharper triangular section than the sectional shape of the annular grooves or a sectional trapezoidal shape having chamfered nose to be fitted. However, the fitting of the wedge-shaped projections in the annular grooves determines the stability of mounting the outer cap on the inner cap. Therefore, the individual wedge-shaped projections are desired to have a section identical or similar to that of the annular grooves. Moreover, the circumferential size and interval of the individual wedge-shaped projections accord to those of the annular grooves, and the number of the wedge-shaped projections may be equal to or less than that of the annular grooves.

Here are considered the case, in which the annular grooves and the wedge-shaped projections have the identical sectional shape. At first, when a downward external force is applied to the outer cap, the wedge-shaped projections slip down along the annular slants forming the annular grooves, to widen the diameter of the skirt portion thereby to release the fitting engagements between the annular grooves and the wedge-shaped projections, so that the outer cap leaves the inner cap. The wedge-shaped projections have to be transversely displaced with respect to the axis of the outer cap so that the wedge-shaped projections may slip down along the annular slants. These displacements are realized by giving to the skirt portion of the outer cap elasticity or flexibility. By setting the length of the skirt portion appropriately longer, moreover, an excessive external force can be prevented from being transmitted to the inner cap when the external force is applied to the outer cap. Concretely, the length of the skirt portion may be so determined that the lower edge of the skirt portion may abut against the car body face when the external force is applied to the outer cap while the fuel filler cap is being secured in the filler port, thereby to prevent the upper face portion of the outer cap from reaching the pressing plate. Thus, the skirt portion also acts as a closing guide or the like to guide the fuel filler cap into the filler port thereby to contribute to an improvement of the operability of the fuel filler cap.

Next, in case the transverse external force is applied to the outer cap, the wedge-shaped projections in the fitted state are pushed up at first along the annular slants of the supporting plate. When the wedge-shaped projections apply a releasing load or greater to the pressing plate, the pressing plate is released from the supporting plate to release the fitted state between the annular grooves and the wedge-shaped projections. Thus, the outer cap leaves the inner cap. Here, the "releasing load" defines an upward load applied to the supporting plate that can release the engagement between the supporting plate and the pressing plate. Likewise, when an upward external force is applied to the outer cap, the raised wedge-shaped projections apply the releasing load or greater to the pressing plate so that the pressing plate is released from the supporting plate thereby to release the fitting relations between the annular grooves and the wedge-shaped projections. Thus, the outer cap leaves the inner cap.

Thus, in the fuel filler cap of the present invention, only the outer cap leaves the inner cap in case the downward external force is applied to the outer cap while the gastightness by the inner cap being kept, and the outer cap and the pressing plate leave the inner cap in case the transverse or upward external force is applied to the outer cap. Therefore, the restoration of the fuel filler cap can be easily achieved if the individual members are mounted or engaged again. Specifically, the pressing plate and the outer cap partially released from the inner cap are once completely released from the inner cap. And then, the pressing plate is removed from the outer cap. The pressing plate thus removed is brought into engagement with the supporting plate to form the annular grooves again. The restoration of the fuel filler cap can be achieved in order that the outer cap covers the pressing plate engaged with the supporting plate to fit the wedge-shaped projections having the lower face slanted into the annular grooves.

The plate engagement means for keeping the supporting plate and the pressing plate integral has to release the engagement of these two plates in case the releasing load or greater is applied to the pressing plate. Therefore, the plate engagement means in the present invention is constructed by a plurality of an engaging projection projecting upward from the upper face of the supporting plate, and a plurality of an engaging hole formed in the pressing plate. The engaging projection may be constructed by a hook portion integrally formed on the top end of a projection body having elasticity and to thereby engage the hook portion to the peripheral edge of the engaging hole by inserting the engaging projections through the engaging holes. As a result, the plate engagement means can be achieved that the engagement between the hook portion and the peripheral edges of the engaging holes are to be released in case that a releasing load or greater is applied upwardly.

Moreover, the relations between the engaging projections and the engaging holes may be revered to provide another plate engagement means. Specifically, this plate engagement means is constructed to include engaging projections projecting downward from the lower face of the supporting plate, and engaging holes formed in the supporting plate. The engaging projection includes the hook portion integrally formed on the bottom end of the projection body having elasticity. This engaging projection engages its hook portion to the peripheral edge of the engaging hole by being inserted throughout the engaging holes. As a result, the plate engagement means can be achieved that the engagement between the hook portion and the peripheral edge of the engaging hole is to be released in case that a releasing load or greater is applied upwardly.

In the fuel filler cap of the present invention, the wedge-shaped projections are individually fitted in the annular grooves individually so that the inner cap opening/closing operations are realized either through the pressing plate or directly by the outer cap. That is, the annular grooves and the wedge-shaped projections engage in the opening/closing direction of the fuel filler cap thereby to realize the opening/closing operation of the inner cap by the outer cap. In other words, it is not desirable that the outer cap is entirely turned idly with respect to the inner cap. For example, it is allowable to turn the outer cap idly within a range of a predetermined angle with respect to the inner cap in that the circumferential length of the individual annular grooves is set up longer than that of the corresponding wedge-shaped projections. Thus, the present invention suits for the bayonet-type fuel filler cap that requires no torque restricting means of turning the outer cap idly with respect to the inner cap.

In addition, in the fuel filler cap for realizing the sealing properties by crushing the seal ring with respect to the upper edge of the filler port, the supporting plate may be used for crushing the seal ring. In other words, it may be constructed in that the supporting plate cramp and crushes the seal ring between the lower face of the supporting plate and the upper edge of the filler port while the fuel filler cap is secured in the filler port. In this case, the supporting plate also acts to guide the seal ring in certain position with respect to the inner cap. If the supporting plate and the seal ring are thus close to each other, the wedge-shaped projections of the outer cap to be slipped down and contact to the seal ring by the downward load applied may cause to damage the seal ring. It is, therefore, advisable to provide the supporting plate with the annular pendulous portion to surround the seal ring.

The fuel filler cap of the present invention has advantageous effects of that, firstly, the outer cap be applied the external force can be released from the inner cap of fitting in the filler port in order to secure the gastightness by the inner cap under any directions of the external force applied to the outer cap. Secondly, in addition, the outer cap is not accompanied by a partial breakage so that the fuel filler cap of the invention can reuse the outer cap or the pressing plate released.

The aforementioned individual advantageous effects come from the construction, in which the wedge-shaped projections of the outer cap are fitted in the annular grooves formed by the supporting plate and the pressing plate. In case the outer cap receives the downward external force, the wedge-shaped projections slip down along the annular slants of the annular grooves so that the plate engagement means is released to release the inner cap from the outer cap. In case the outer cap receives the transverse or upward external force, on the other hand, the wedge-shaped projections push up the pressing plate with the releasing load or greater thereby to release the plate engagement means thereby to release the inner cap from the outer cap. In either case, accordingly, the fuel filler cap of the present invention can be easily reconstructed by fitting the wedge-shaped projections again in the annular grooves, because of the simple construction for releasing the fitting between the annular groove and the wedge-shaped projections.

The plate engagement means provides a first advantageous effect to release the outer cap from the inner cap, in case the outer cap receives the transverse or upward direction while the supporting plate and the pressing plate are integrally turned in the opening/closing direction of the fuel filler cap. The plate engagement means composed of the engaging projections and the engaging holes respectively assigned to the supporting plate and the pressing plate can be easily manufactured and also can adjust the adequate releasing load by setting the structure or number of the engaging projections and the engaging holes. Thus, the plate engagement means composed of the engaging projections and the engaging holes has an advantageous effect to set the amount of the external force releasing the outer cap from the inner cap by utilizing the engaging relations between the engaging projections and the engaging holes against the downward or transverse external force forcing the inner cap open.

Thus, the supporting plate provides a base for releasing the outer cap from the inner cap. In addition, the supporting plate is positioned just above the seal ring so that it can be utilized as the portion to crush the seal ring. This structure contributes to the reduction of the number of parts. Moreover, this supporting plate appears that the supporting plate radially extends with respect to the seal ring. In other words, the supporting plate also acts to protect the seal ring against contacting with the wedge-shaped projections that slip down in case the outer cap receives the downward external force. Further, to form the annular pendulous portion of the supporting plate surrounding the seal ring has the advantageous effect to protect the seal ring more reliably against contacting with the wedge-shaped projections.

BRIEF DESCRIPTION OF THE DRAWINGS

FIG. 3 is a partially enlarged view of a portion circled in FIG. 2 taken in the direction of arrow 14a;

DETAILED DESCRIPTION OF THE INVENTION

Figure 1:
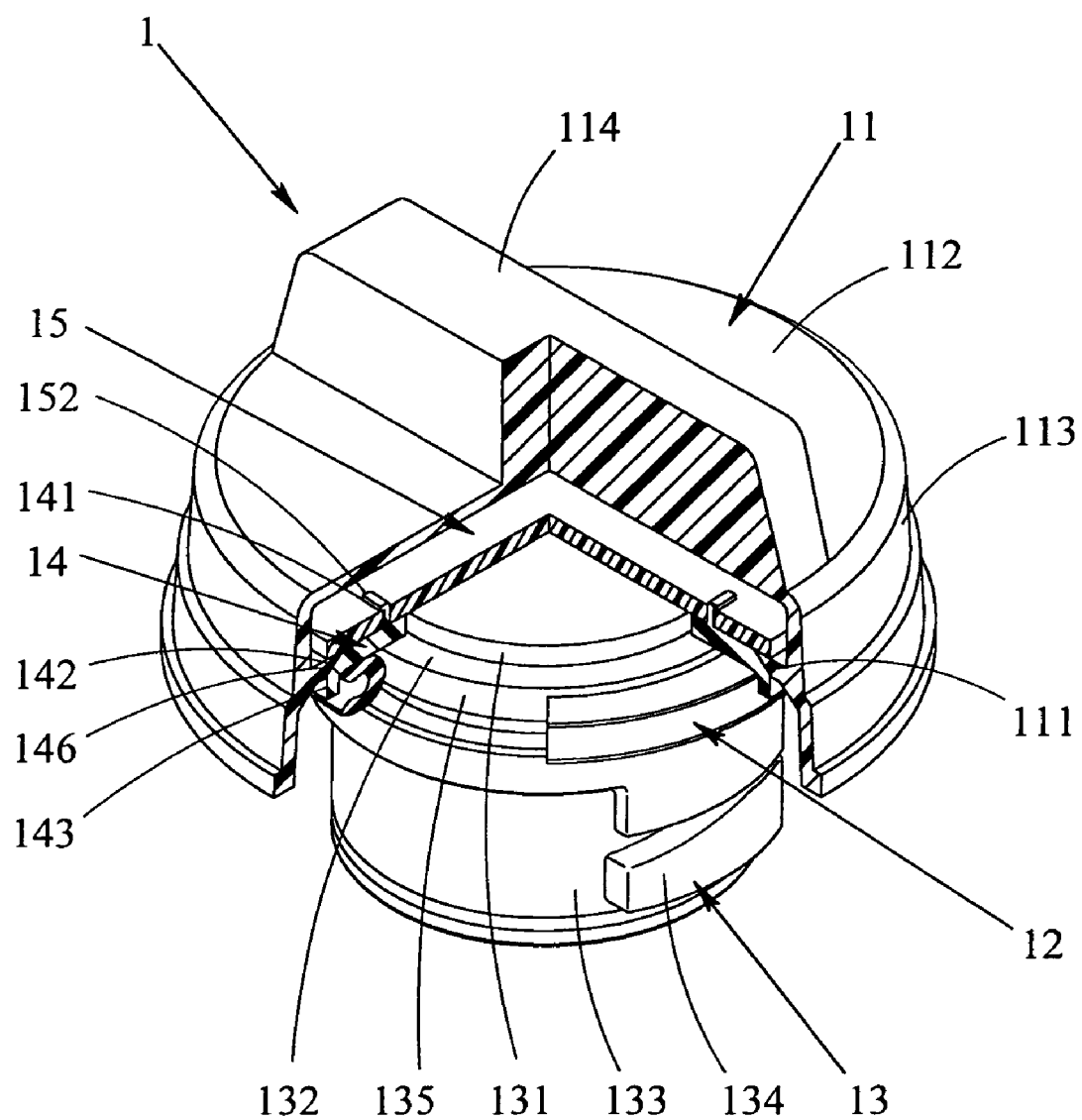
FIG. 1 is a partially broken perspective view of a bayonet-type fuel filler cap according to the present invention.

Embodiments of the invention will be described with reference to the accompanying drawings. The invention is suitable for a bayonet-type fuel filler cap 1 requiring no torque restricting function. Thus, this bayonet-type fuel filler cap 1 is shown in the individual drawings.

The embodiment is directed to the bayonet-type fuel filler cap 1 for realizing the sealing properties by pushing and crushing a seal ring 12 to the upper edge of a filler port 2, as shown in FIG. 1 to FIG. 5. Specifically, the fuel filler cap 1 is basically composed of: an inner cap 13 made of a resin into a substantially cylindrical member and fitted on the outer face of the seal ring 12; and an outer cap 11 made of a resin into a cover member and fitted on the inner cap 13. Moreover, the entire fuel filler cap of this embodiment is further constructed by laying a pressing plate 15 made of a resin into a circular outer shape in a top plan view, on a supporting plate 14 mounted on the inner cap 13.

The inner caps 13 is composed of: an inner cap body 133 having an annular mounting base 132 formed around a positioning protrusion 131 protruding upward; and the annular supporting plate 14 fitted and mounted on the positioning protrusion 131 of the inner cap body 133. The inner cap 13 of this embodiment includes: a pair of bayonet-cams 134 formed at centrally symmetric positions on its outer face for engaging with the ridge 21 of the filler port 2; and a fitting circumferential face 135 formed at the upper location of the bayonet-cams 134 and having a width corresponding to the thickness of the seal ring 12. This seal ring 12 is fitted on the fitting circumferential face 135. The seal ring 12 of this embodiment is formed to have a C-shaped section opening outwardly, but it may apply a solid seal ring having a circular section because the actions and effects o the invention are not influenced by the structure of the seal ring.

The supporting plate 14 is an annular member made of a resin having a size of the configuration shaped in a circular top plan view sufficient to cover the seal ring 12. This supporting plate 14 is adhered by fitting to the positioning protrusion 131 arranged at the upper portion of the inner cap body 133. The positioning protrusion 131 is formed in a circular shape in a top plan view and a thickness equal to that of the supporting plate 14. The individual top faces of the positioning protrusion 131 and the supporting plate 14 are flush with each other. The adherence means of the supporting plate 14 to the inner cap body 133 is exemplified by a variety of known means such as a screwing, a cementing, and so on.

The supporting plate 14 of this embodiment is provided with: four engaging projections 141 projecting upward from the upper face thereof and arranged at equal intervals in the circumferential direction; and four annular slants 142 formed downward intermittently in the circumferential direction descending radially outward by chamfering the peripheral edges of the upper faces of the engaging projections 141. Further, an annular pendulous portion 143 extending downwardly from the peripheral edges of the annular slants 142 to surround the seal ring 12 is provided. The engaging projections 141 are made to have a height corresponding to the thickness of the pressing plate 15 and are provided individually with a hook portion 145 projecting outward from the top end of the projection body 144, which has such an configuration in a top plan view as is partially cut out from the circumference. The annular pendulous portions 143 have a function to prevent from that the wedge-shaped projections 111 might damage the seal ring 12 when the outer cap 11 is to be released from the inner cap 13 by a downward external force applied. In addition, the annular pendulous portions 143 have a further function as to reinforce the strength of the peripheral edge of the supporting plate 14, which ais sharpened by forming the annular slants 142 downwardly.

The outer cap 11 is a substantially frusto-conical cover member having a size for covering so far the portion as the seal ring 12 fitted on the inner cap 13. The outer cap 11 has a structure composed of an upper face portion 112 having a circular shape in a top plan view and an internal diameter larger than the outer diameter of the supporting plate 14, and a skirt portion 113 extending downward integrally from the outer circumference of the upper face portion 112. In this embodiment, the outer cap 11 is provided on its upper face portion 112 with a handle grip 114 for assisting the opening/closing operations, but the handle grip 114 can be dispensed with.

Figure 7:
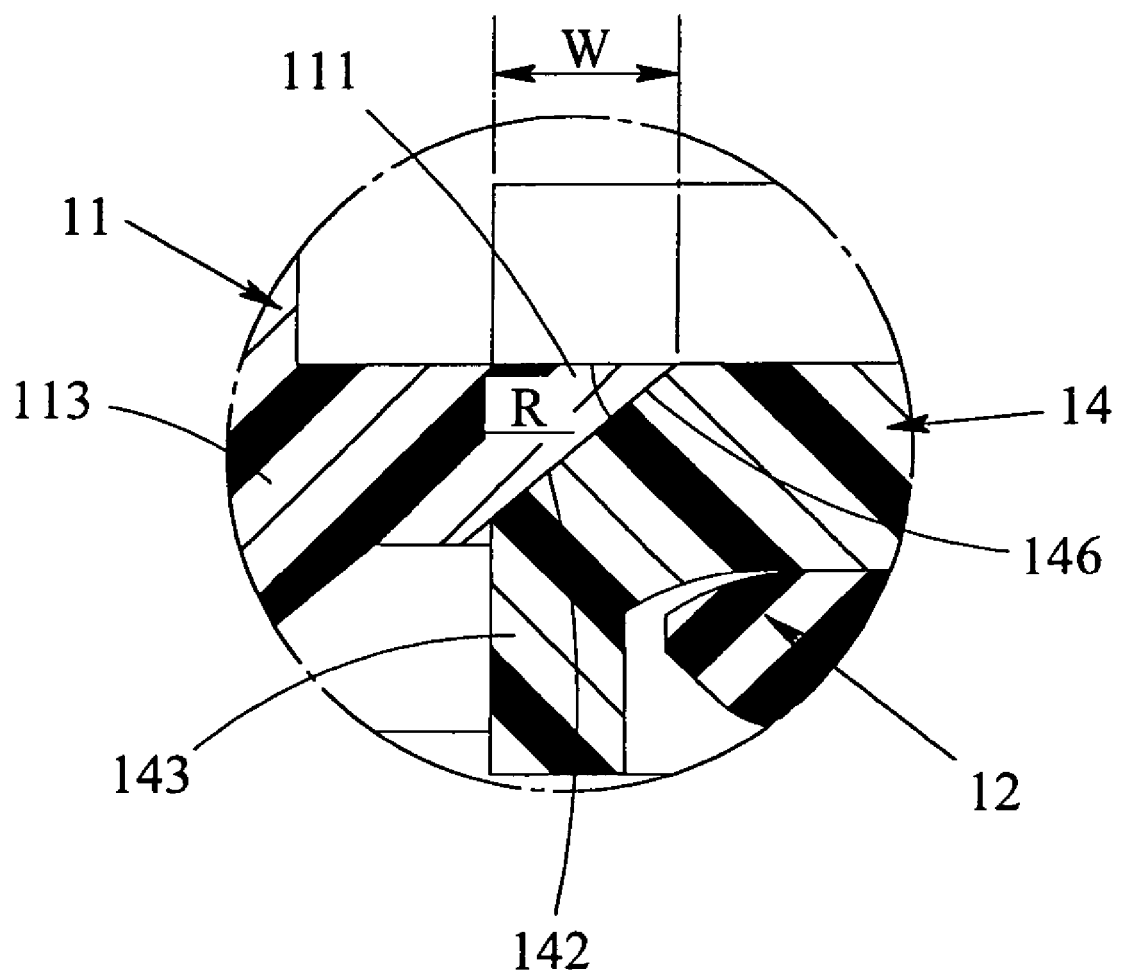
FIG. 7 is a partially enlarged view of a portion encircled in FIG. 5 taken in the direction of arrow II.

The skirt portion 113 is provided on its inner face with the four wedge-shaped projections 111, which project radially inward and arranged with equal intervals in the circumferential direction. The number of the wedge-shaped projections 111 is arbitrary but is desired at least two in a centrally symmetric relation. Preferably, three to six wedge-shaped projections may be arranged with equal intervals in the circumferential direction. The individual wedge-shaped projections 111 of this embodiment have a triangular sectional shape similar to that of the annular groove 146 and are arranged with equal intervals and width to the four annular grooves 146 defined by the individual annular slants 142 of the supporting plate 14 and the lower face of the pressing plate 15, as shown in FIG. 7.

The pressing plate 15 is a plate-shaped resin member having a circular shape in a top plan view identical to the outer shape of the supporting plate 14. The pressing plate 15 is provided in its surface with four engaging holes 152, which are arranged with equal intervals in the circumferential direction and at the same positional relation as that of the engaging projections 141 arranged on the supporting plate 14. This pressing plate 15 is laid over the supporting plate 14 by inserting the engaging projections 141 of the supporting plate 14 into the engaging holes 152 such that the hook portions 145 of the individual engaging projections 141 are engaged on the peripheral edges of the engaging holes 152. Thus, the pressing plate 15 is supported stable by utilizing g the positioning protrusion 131 of the inner cap 13 and the supporting plate 14 as a result of that the plate engagement means composed of the engaging projections 141 and the engaging holes 152 constructs close integral relation with the supporting plate 14. Here, the number of the engaging projections 141 and the engaging holes 152 is arbitrary, and, although not shown, the number of the engaging holes 152 may be larger than tthat of the engaging projections 141, as long as the engaging projections 141 engage with the engaging holes 152 correspondingly.

In the fuel filler cap 1 of the present invention, the outer cap 11 is mounted on the inner cap 13 by fitting the wedge-shaped projections 111 formed on the inner face of the skirt portion 113 into four of the individual annular grooves 146 formed by laying the pressing plate 15 over the supporting plate 14 having the annular slants 142. At the same time, the outer cap 11 and the inner cap 13 can be turned integrally with each other. Therefore, in case of setting up a play of the outer cap 11 in the turning direction with respect to the inner cap 13, it is advisable that the circumferential length of the individual annular grooves 146 is set longer than that of the individual wedge-shaped projections 111 as much as the length of the play required. Further, the mounting stability of the outer cap 11 to the inner cap 13 depends on the fitting relation the wedge-shaped projections 111 to the annular grooves 146. Furthermore, as shown in FIG. 7, the sectional shape of the annular groove 146 and the wedge-shaped projection 111 are formed in identical so that the mounting stabilities of the outer cap 11 and the inner cap 13 can be secured against the external force applied form any directions. At the same time, it is advisable that a depth W of the annular groove 146 is set around several millimeters, and that an angle R of inclination of the annular slant 142 may also set in acute, in order to enable the stable release of the outer cap 11 from the inner cap 13.

Figure 5:
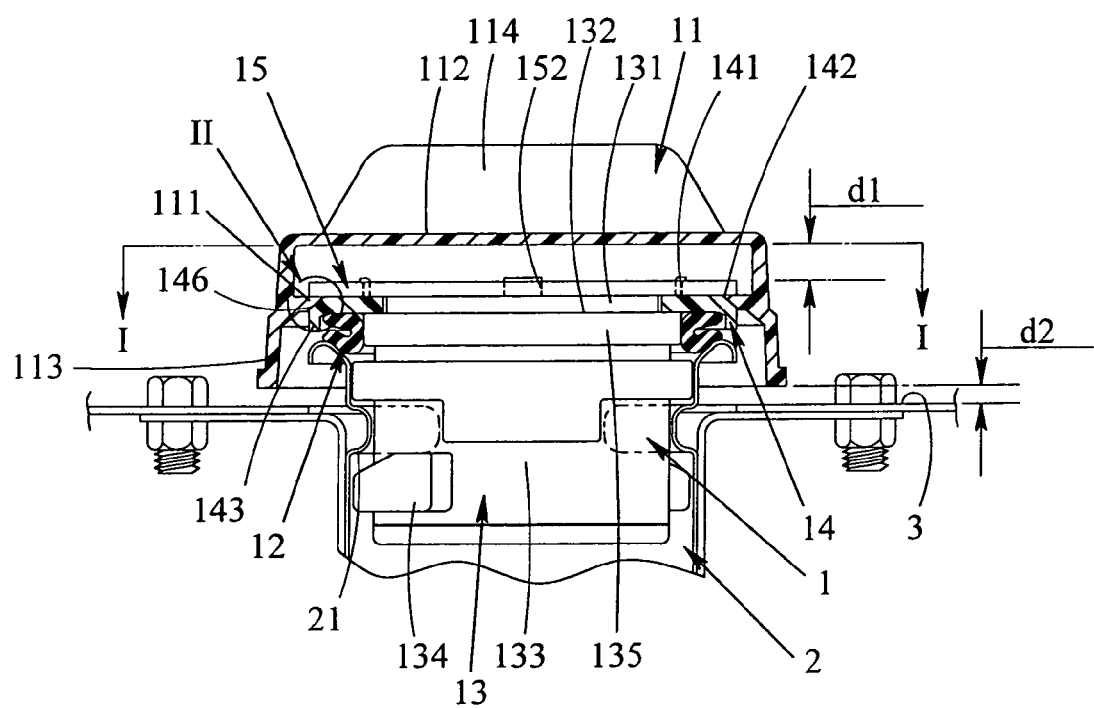
FIG. 5 is a partially sectional view showing the state, in which the fuel filler cap is secured in a filler port.
Figure 6:
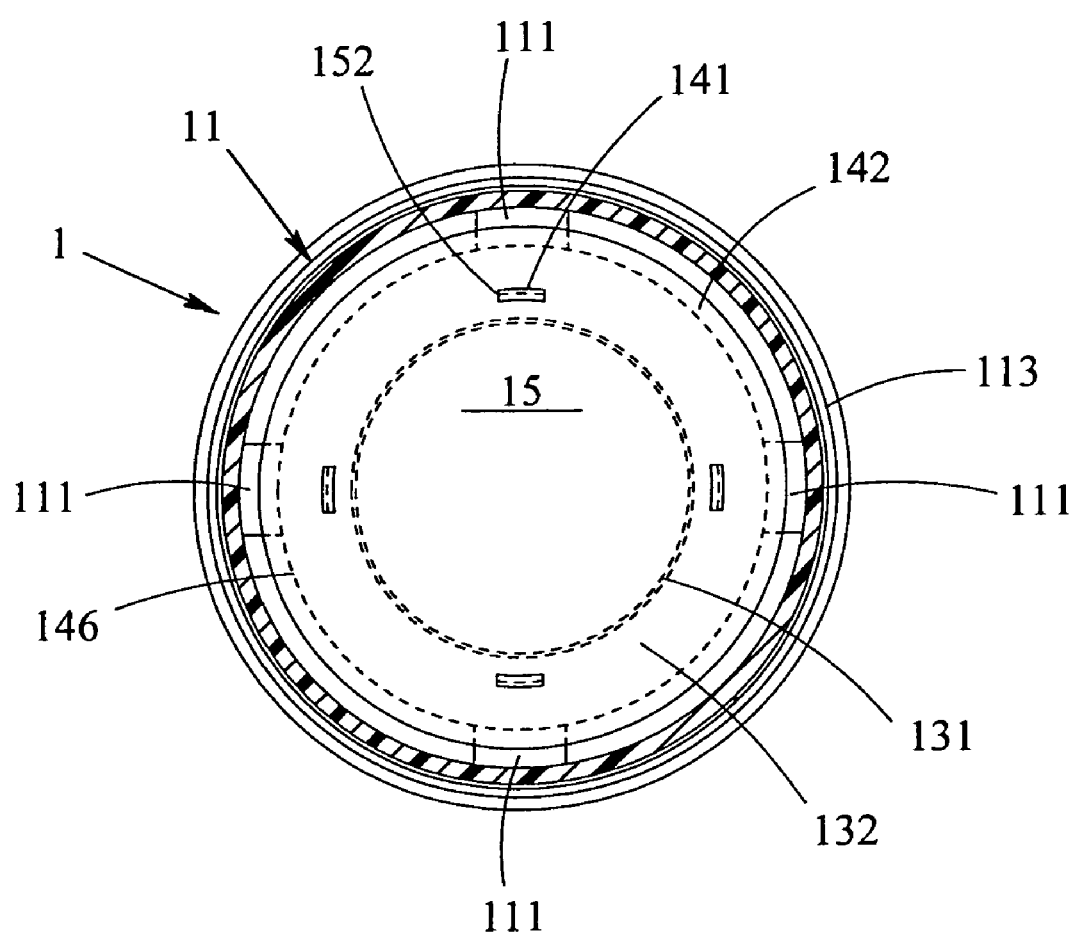
FIG. 6 is a section taken on line I-I in FIG. 5.

Under the condition of that the fuel filler cap 1 is secured with the filler port 2, moreover, it is advisable that the length of the skirt portion 113 is set longer, in order to improve the operability of the fuel filler cap 1 while preventing an excessive transmission of the external force from the outer cap 11 to the inner cap 13. In this embodiment, as shown in FIG. 5, the length of the skirt portion 113 is determined so that, in the secured state of the fuel filler cap 1, a distance d1 from the lower face of the upper face portion 112 of the outer cap 11 to the upper face of the pressing plate 15 is to be longer than the distance d2 from the lower edge of the skirt portion 113 to a car body face 3.

The fuel filler cap 1, as shown in FIGS. 1 to 4, adopts the construction to mount the outer cap 11 to the inner cap 13, in the manner that the outer cap 11 is mounted by laying the pressing plate 15 over the supporting plate 14 of the inner cap 13 thereby to integrate them by the plate engagement means and then by fitting the wedge-shaped projections 111 in the annular grooves 146 defined by the annular slants 142 of the supporting plate 14 and by the lower face of the pressing plate 15. This fuel filler cap 1 is secured by fitting the inner cap 13 in the filler port 2 and by turning the outer cap 11 in the closing direction. In the same time, as shown in FIG. 5, this fuel filler cap 1 realizes the sealing properties by that the supporting plate 14 pushes and crushes the seal ring 12 on the upper edge of the filler port 2. By turning the outer cap 11 in the opening direction from that secured state of the fuel filler cap 1, on the other hand, the fuel filler cap 1 can be released from the filler port 2. As described above, the fuel filler cap 1 of the invention has no particular difference in its ordinary use from that of the prior art.

Figure 8:
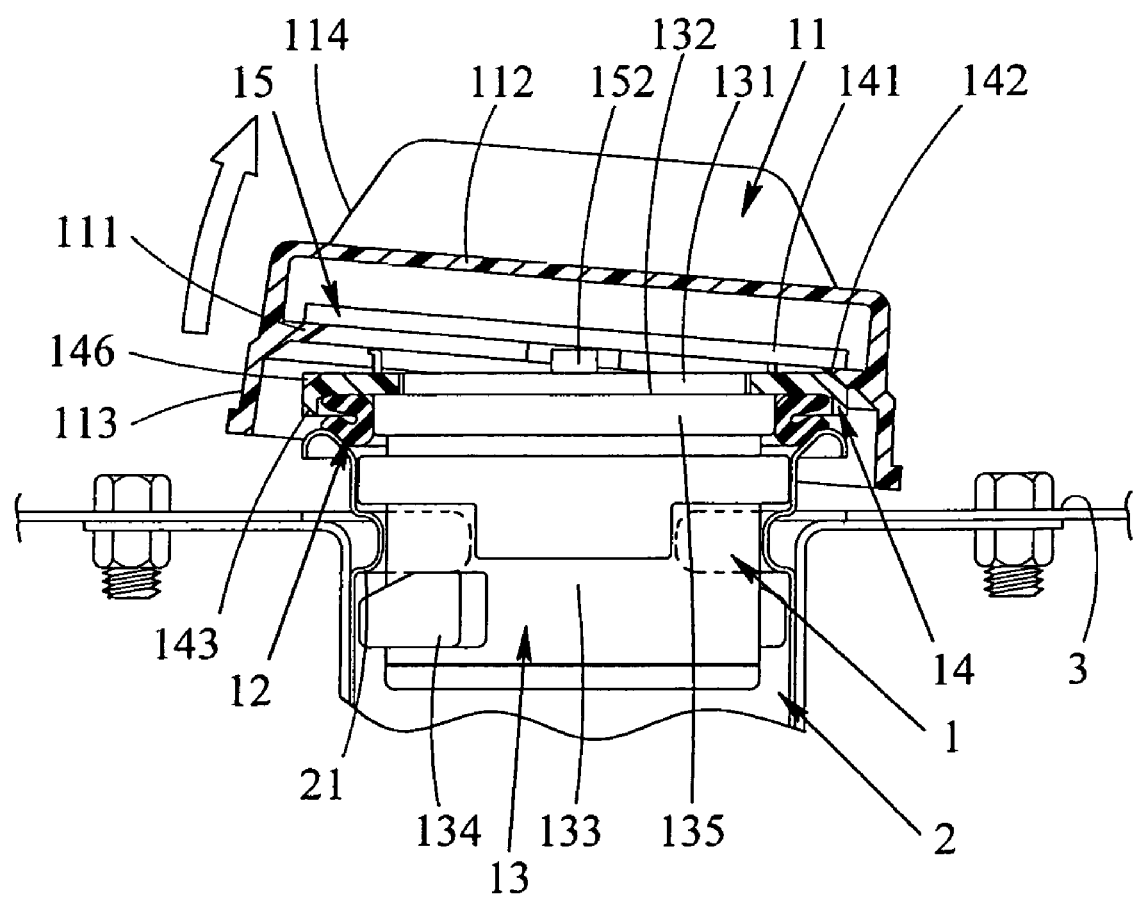
FIG. 8 is a partially sectional view corresponding to FIG. 5 for explaining the release of an outer cap in case an outer cap receives a transverse or upward external force.

When an external force is transversely applied to the outer cap 11 of the fuel filler cap 1 in the aforementioned secured state, the wedge-shaped projections 111 are pushed up along the annular slants 142 of being one of the elements forming the annular grooves 146. When these wedge-shaped projections 111 apply a releasing load or greater upward to the pressing plate 15, they release the pressing plate 15 from the supporting plate 14 thereby to release the fitting relations between the individual annular grooves 146 and the wedge-shaped projections 111. Thus, the outer cap 11 is released from the inner cap 13, as shown in FIG. 8. When an external force is applied upward to the outer cap 11 of the fuel filler cap 1 in the secured state, the wedge-shaped projections 111 are directly pushed up to release the fitting relations between the individual annular grooves 146 and the wedge-shaped projections 111 as above described in when the external force is transversely applied, thereby to release the outer cap 11 from the inner cap 13. In either case, the external force is prevented by releasing the outer cap 11 from the inner cap 13 from being transmitted to the inner cap 13 and thereby to secure the sealing properties resulting from the crush of the seal ring 12.

Either of the releases of the outer cap 11 is provided by the release of the plate engagement means so that not only the outer cap 11 but also the pressing plate 15 is not damaged. Moreover, the pressing plate 15 left from the supporting plate 14 is still received in the outer cap 11 with the interference of the wedge-shaped projections 111 so that the pressing plate 15 stays in the condition being not easily to fall off. Thus, it further prevents from apprehension of loss of the pressing plate 15. According to this structure, the fuel filler cap 1 is easily enabled to reconstruct by laying the pressing plate 15 again over the supporting plate 14 thereby to be engaged with the plate engagement means and by fitting the wedge-shaped projections 111 again, respectively, in the individual annular grooves 146 formed.

Figure 9:
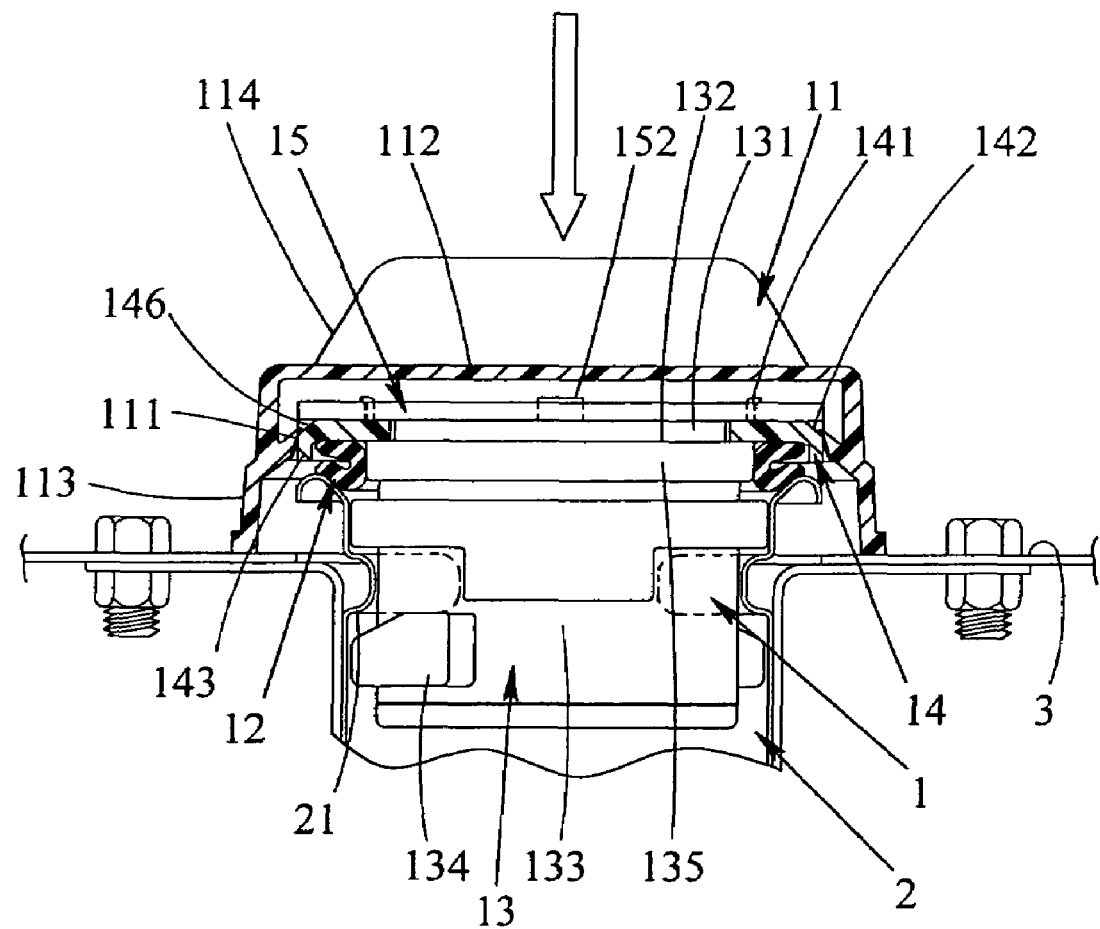
FIG. 9 is a partially sectional view corresponding to FIG. 5 for explaining the release of an outer cap in case an outer cap receives a downward external force.

When the external force is applied downward to the outer cap 11 of the fuel filler cap 1 in aforementioned secured state, the wedge-shaped projections 111 slip down along the annular slants 142 forming annular grooves 146, with the skirt portion 113 being elastically deformed, so that the outer cap 11 comes off from the annular grooves 146. Thus, the outer cap 11 leaves the inner cap 13, as shown in FIG. 9. Here, if the length of the skirt portion 113 is set as described above, when the external force applied, the lower edge of the skirt portion 113 abuts against the car body face 3 so that the external force is prevented from being transmitted from the outer cap 11 to the inner cap 13 thereby to maintain the sealing properties resulting from the crush of the seal ring 12. Moreover, in this embodiment, the pressing plate 15 is kept in engagement with the supporting plate 14 by the engagement means. Therefore, the outer cap 11 is once removed from the inner cap 13 completely in order to fit the wedge-shaped projections 111 again to the annular grooves 146 properly, so that the fuel filler cap 1 can be easily reconstructed.

The fuel filler cap of the invention may be constructed to fit the outer cap provided with the wedge-shaped projections intermittently in circumferential direction and the inner cap provided with the annular grooves intermittently in circumferential direction. With these certain constructions of the outer/inner caps, it is not so important how the plate engagement means and the annular grooves are are constructed. Moreover, the constructions of the supporting plate and the pressing plate are not restricted to those of the foregoing embodiment. FIGS. 10 to 15 are perspective views corresponding to FIG. 2 but show the extractions of the portions different from those of the embodiment shown in FIGS. 1 to 9.

Figure 10:
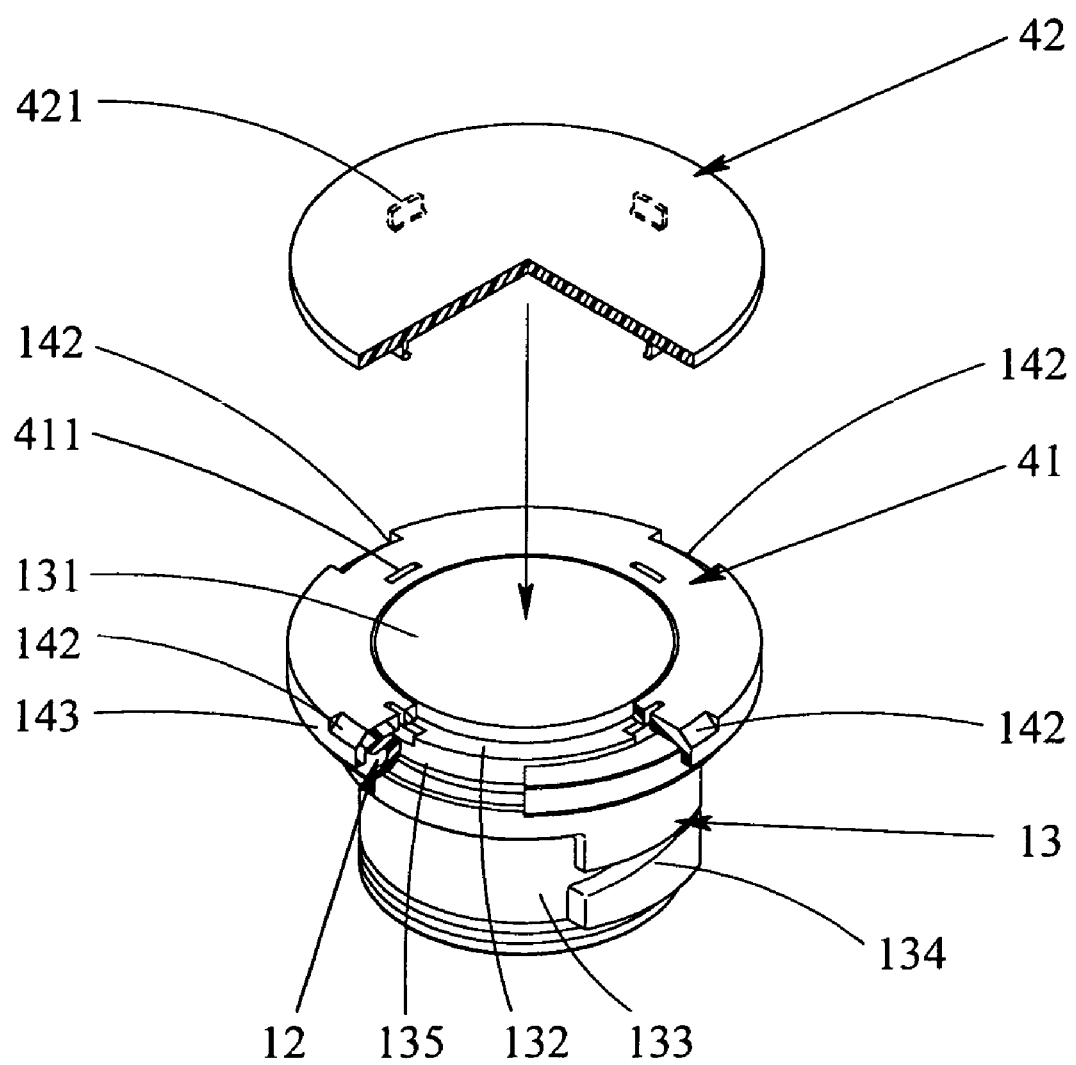
FIG. 10 is a perspective view extracted a pressing plate and an inner cap corresponding to FIG. 2 but shows the reversed relation of engaging projections and engaging holes both composing plate engagement means.

The plate engagement means may determine the amount of the external force for releasing the outer cap from the inner cap 13 while realizing the integration between the supporting plate and the pressing plate. Accordingly, the plate engagement means engaging the engaging holes 411 and the engaging projections 421 may be constructed in that the supporting plate 41 is provided with four engaging holes 411 arranged with equal intervals in the circumferential direction and the pressing plate 42 is provided on the lower face thereof with four engaging projections 421 arranged with equal intervals corresponding to that of the individual engaging holes 411, as shown in FIG. 10.

Figure 11:
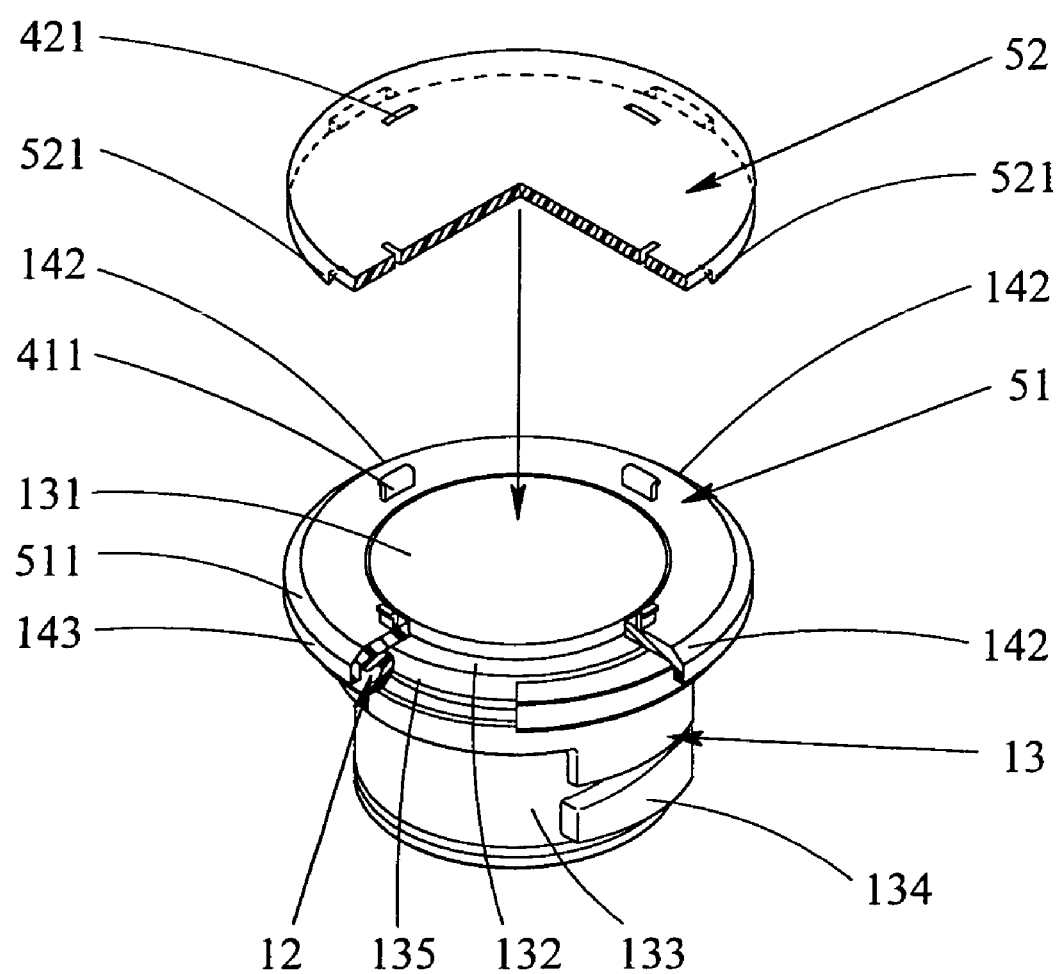
FIG. 11 is a perspective view extracted an outer cap and a pressing plate corresponding to FIG. 2 but shows an embodiment, in which the supporting plate provided with the annular slant continuously in circumferential direction and the pressing plate provided with the engagement blocks intermittently in circumferential direction form a plurality of the annular groove by overlaying the supporting plate and the pressing plate.

Likewise, if the wedge-shaped projections are fitted in the annular grooves formed intermittently in circumferential direction, the turning motion of the outer cap can also be transmitted to the inner cap eventually. As shown in FIG. 11, for example, a supporting plate 51 is chamfered at first at the peripheral edge of its upper face radially outward to form the continuous annular slant 511, downward in the circumferential direction. Then, the pressing plate 51 having a plurality of the engaging block 521 having a surface to contact with the corresponding annular slant 511 of the supporting plate 51 is laid over the supporting plate 51, so that a plurality of the annular groove may also be formed intermittently in circumferential direction by the annular slants 511 of the supporting plate 51 and the lower face of the pressing plate 52 corresponding to the gaps formed between the engagement blocks 521. In this modification, the wedge-shaped projections 111 engage also circumferentially with the engagement blocks 521 of the pressing plate 52 so that the outer cap 11 and the pressing plate 52 turn integrally in the opening/closing direction.

Figure 2:
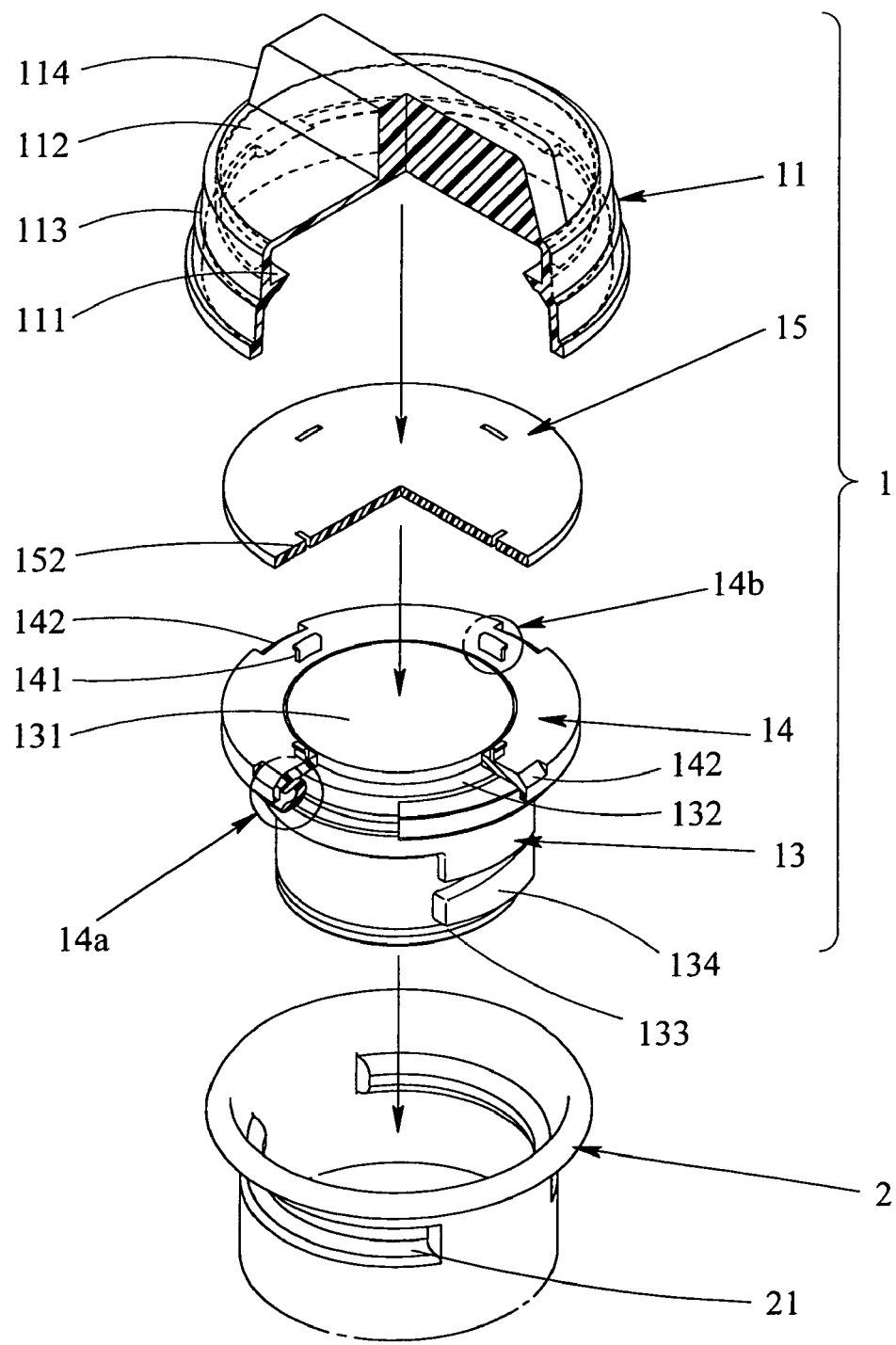
FIG. 2 is an exploded and partially broken perspective view of the essential portions of the same fuel filler cap.
Figure 3:
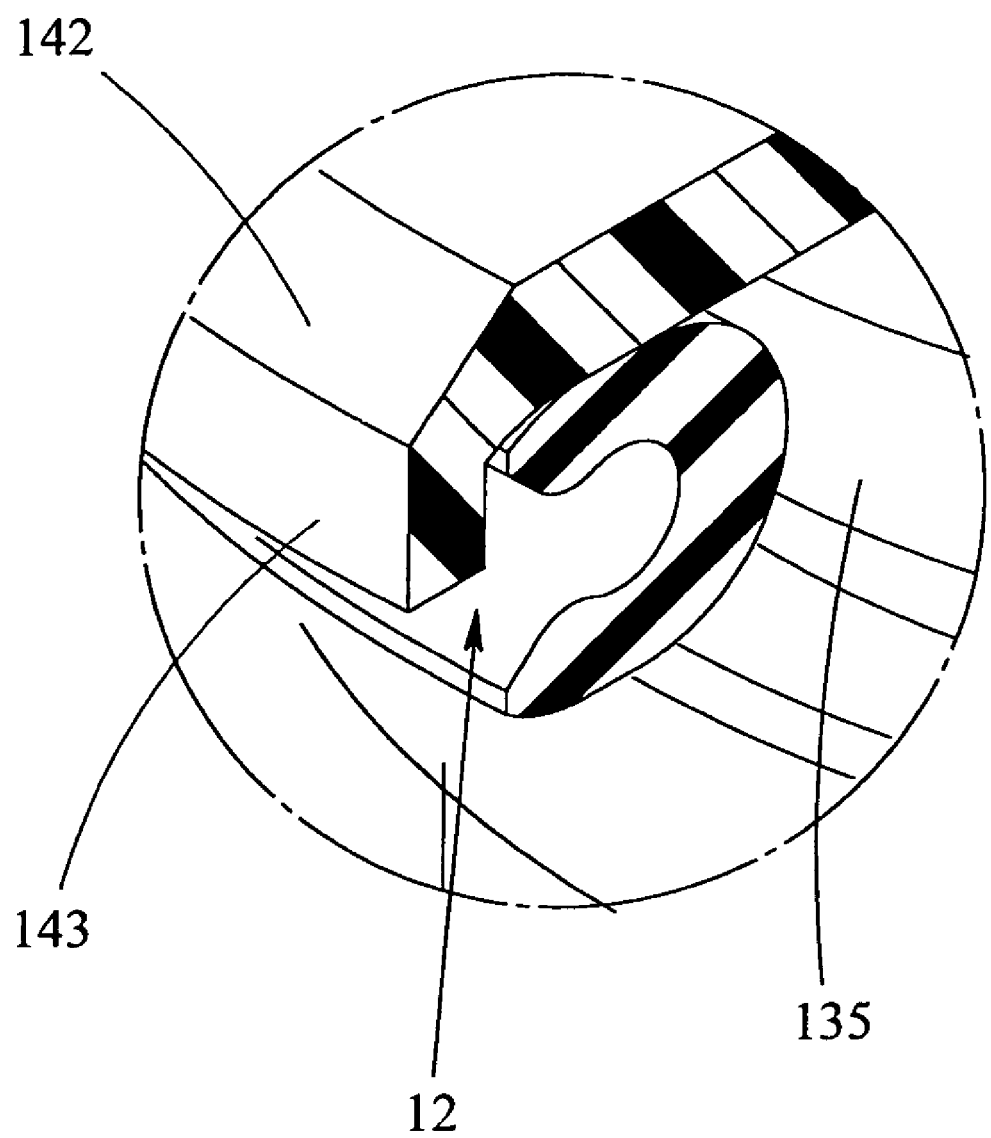
Figure 4:
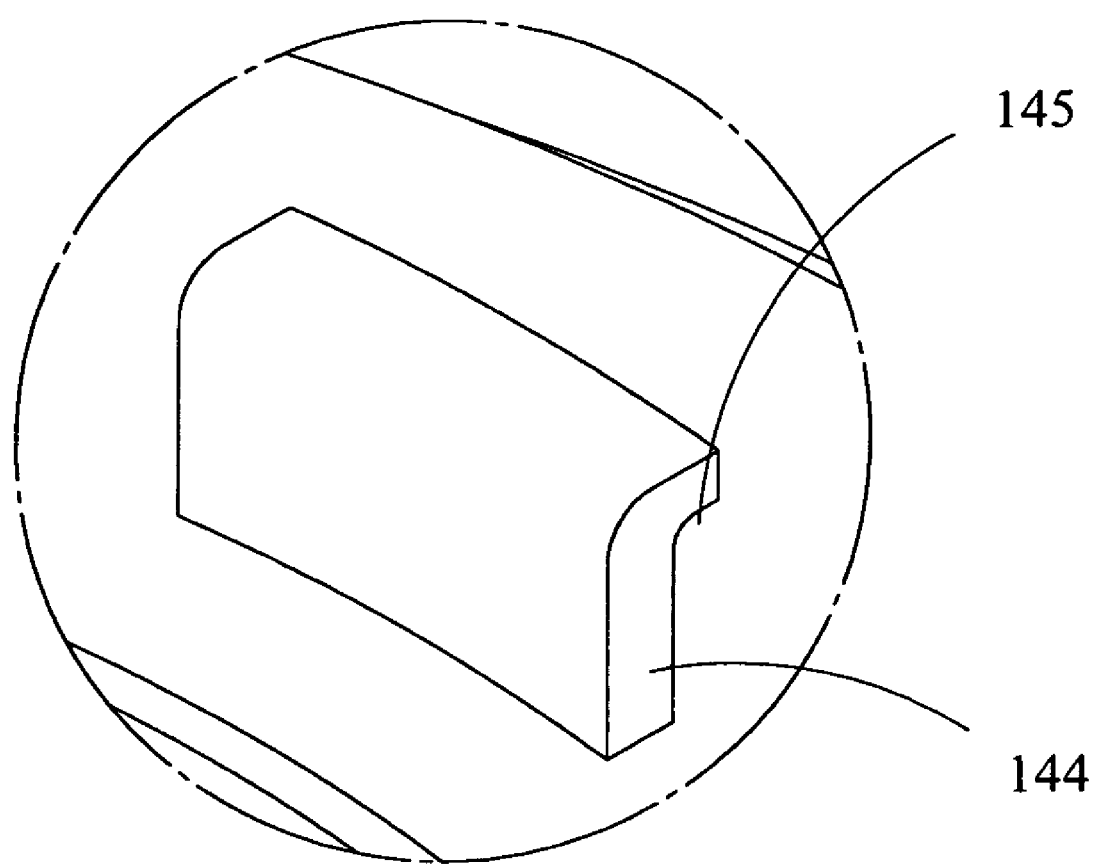
FIG. 4 is a partially enlarged view of a portion encircled in FIG. 2 taken in the direction of arrow 14b.
Figure 12:
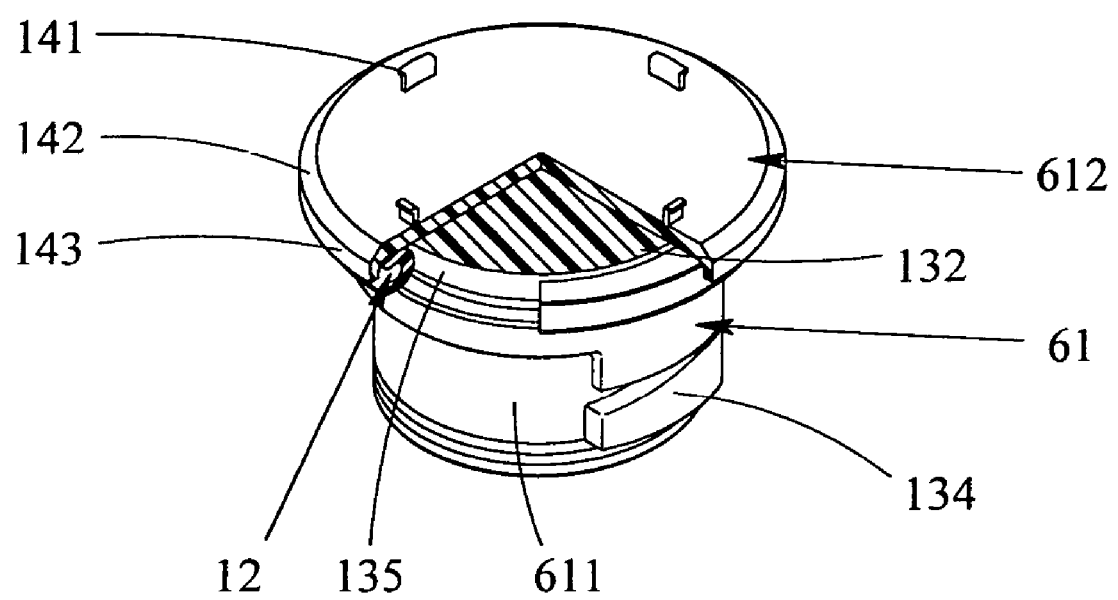
FIG. 12 is a perspective view extracted the inner cap corresponding to FIG. 2 shows a supporting plate of another embodiment formed integrally with an inner cap body.
Figure 13:
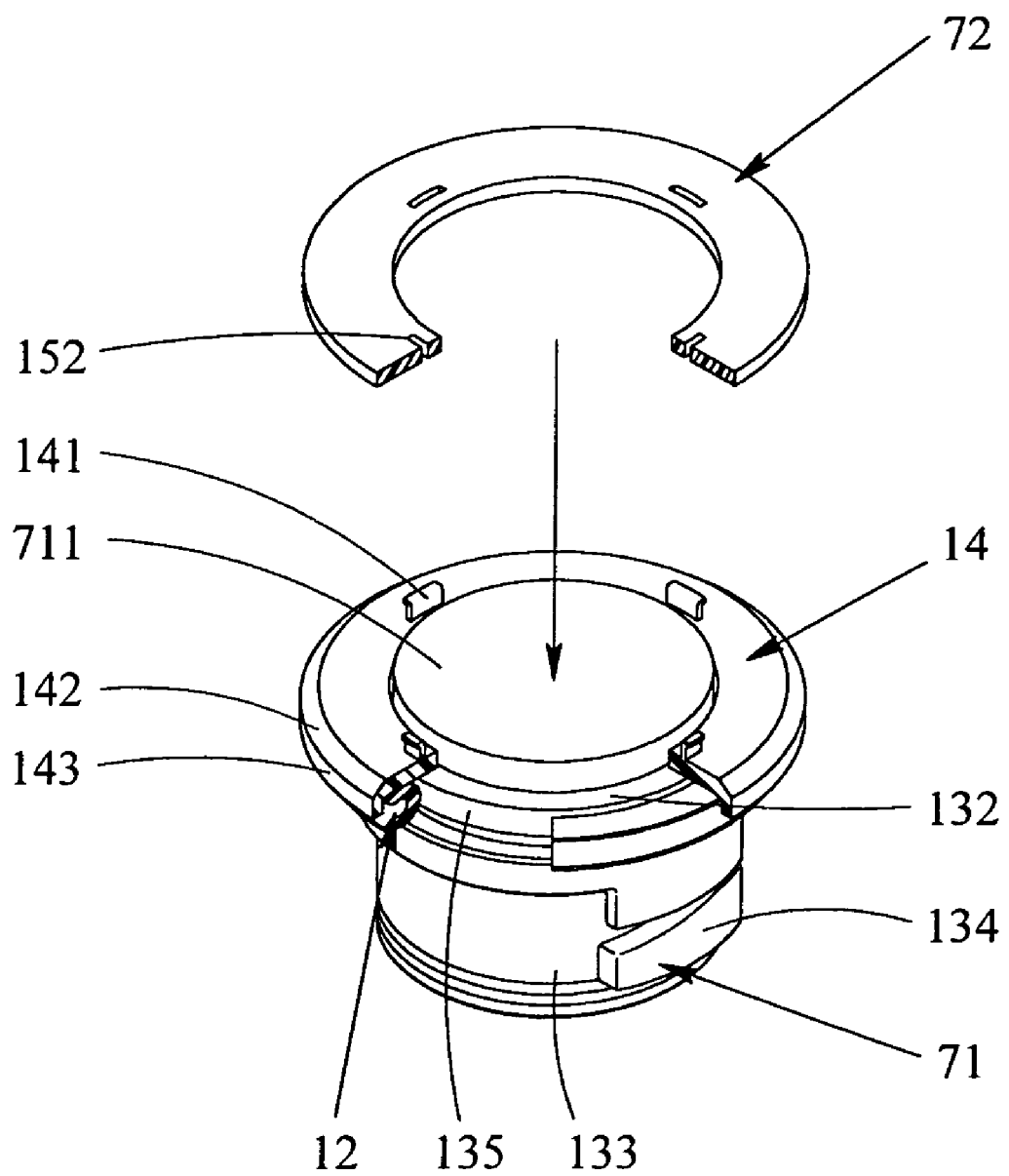
FIG. 13 is a perspective view extracted the pressing plate and the inner cap corresponding to FIG. 2 shows an annular pressing plate to be fitted to a positioning protrusion formed on the top of the inner cap body.

The foregoing embodiment has the construction, in which the supporting plate as an individual member is mounted on the inner cap body. On the other hand, however, it is not necessary for the supporting plate to separate from the inner cap when the outer cap releases from the inner cap. Therefore, as shown in FIG. 12, for example, the inner cap 61 formed by the inner cap body 611 integrally with the supporting plate 612 may be applied. Moreover, as shown in FIG. 2, the foregoing embodiment exemplifies the substantially disc-shaped pressing plate 15, which is laid over the positioning protrusion 131 of the inner cap body 133 and the annular supporting plate 14. However, the lower face of the pressing plate 15 necessary for forming the annular grooves 146 is limited to the vicinity of the peripheral edge. Therefore, for example, the inner cap 71 provided with the positioning protrusion 711 extended upward and the pressing plate 72 having annular shape to be fitted to the positioning protrusion 711 may be applied, as shown in FIG. 13. Alternatively, although not illustrated, the supporting plate may also be provided with the positioning protrusion.

Figure 14:
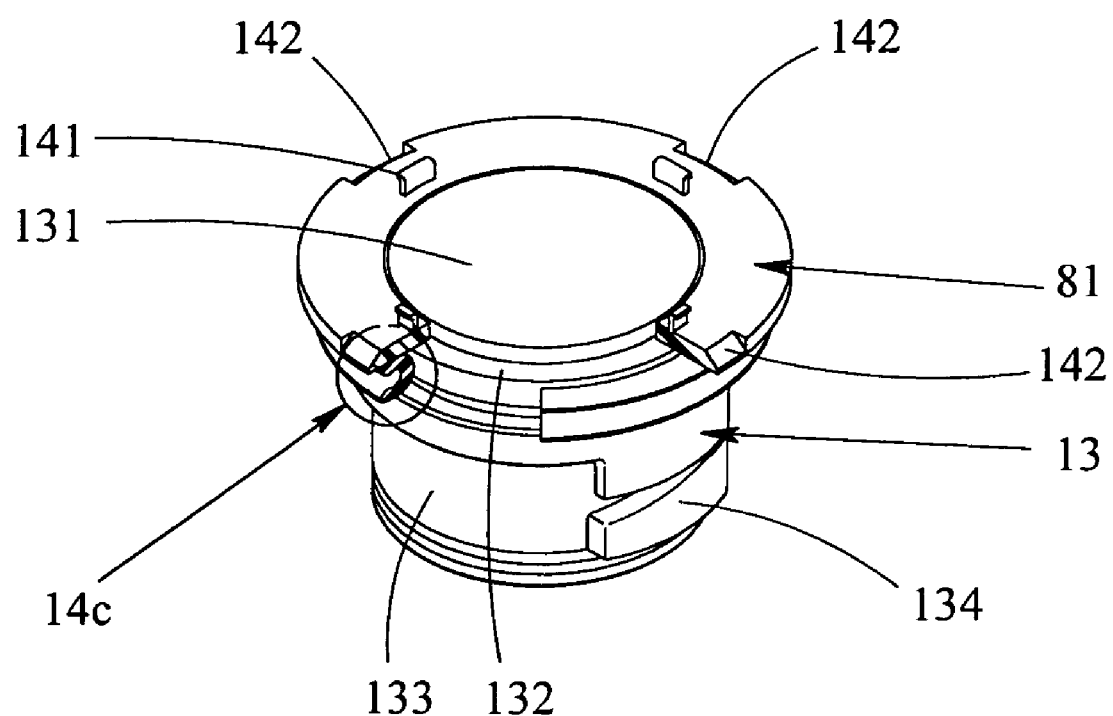
FIG. 14 is a perspective view extracted the inner cap corresponding to FIG. 2 shows a supporting plate having no annular pendulous portion.
Figure 15:
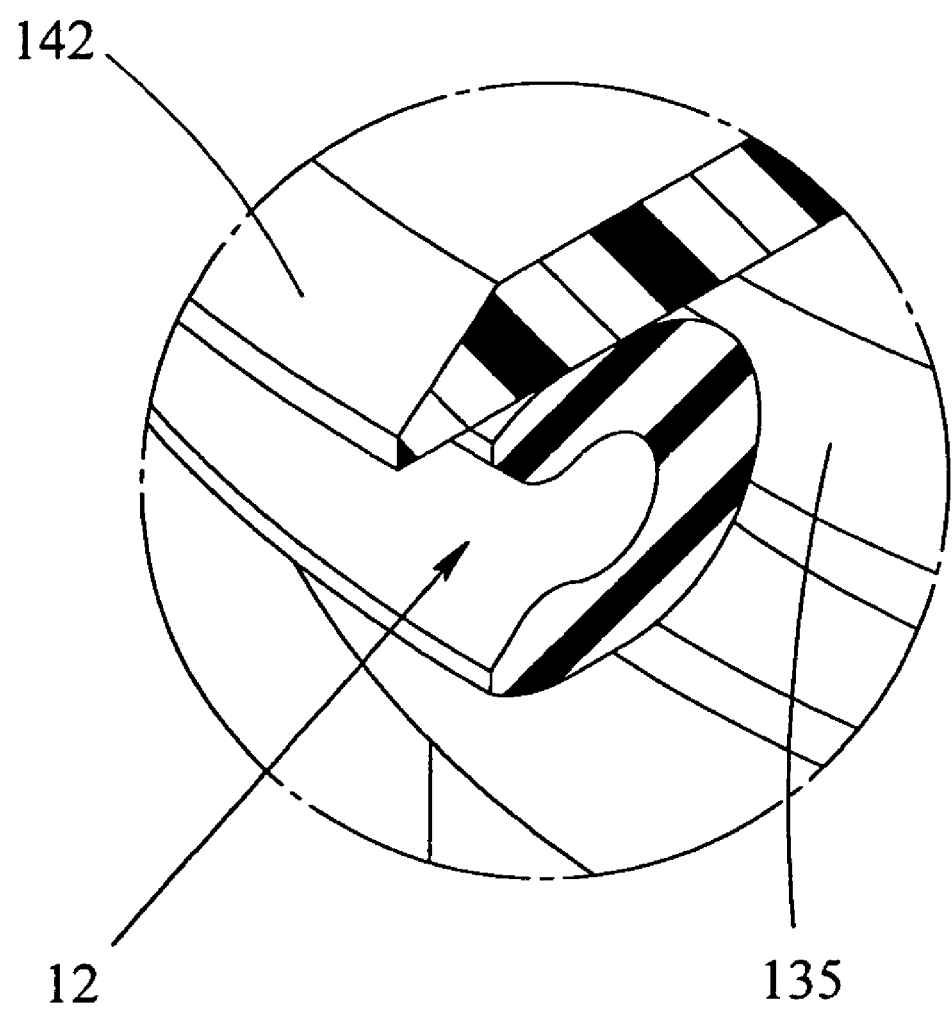
FIG. 15 is a partially enlarged view of a portion encircled in FIG. 14 taken in the direction of arrow 14c.

In addition, the supporting plate in the embodiment is provided on its peripheral edge with the annular pendulous portion so that the wedge-shaped projections that causes damaging the seal ring while the outer cap leaves may be prevented. However, the annular pendulous portion is not essential for the present invention. For example, there may be provided with a supporting plate 81 having no annular pendulous portion 811, as shown in FIGS. 14 and 15. As long as the configuration of the supporting plate 81 is sufficiently larger than the seal ring 12 in this modification, the wedge-shaped projections 111 do not cause damaging the seal ring 12 when the outer cap 11 is released from the inner cap 13 by the downward external force applied.

What is claimed is:

1. A fuel filler cap comprising: an inner cap of a substantially cylindrical member; and an outer cap of a cover member mounted on the inner cap:

wherein the outer cap includes an upper face portion having a circular shape, a skirt portion integrally extending downward from an outer circumference of the upper face portion, and a plurality of wedge-shaped projections having a triangular section formed circumferentially intermittently on an inner face of the skirt portion; wherein a pressing plate has a circular shape, as viewed in a top plan, and has a smaller diameter than the internal diameter of the skirt portion; wherein the inner cap includes a supporting plate having a circular shape, as viewed in a top plan, and having at least the number of annular slants formed radially downward and obtained by chamfering a peripheral edge of an upper face thereof intermittently by at least in a positional relation corresponding to the wedge-shaped projections, a seal ring fitted between a lower face of the supporting plate and an outer face of an inner cap body, and a plurality of annular grooves defined by the annular slants of the supporting plate and by a lower face of the pressing plate laid over the supporting plate; and wherein the pressing plate and the supporting plate are provided with a plate engagement means for turning integrally in an opening/closing direction of the fuel filler cap and for releasing an engaged state of the pressing plate with the supporting plate when a releasing load is applied upward to the pressing plate, said wedge-shaped projections are fitted to the plurality of annular grooves engagement holes are formed between the pressing plate and supporting plate in which an upper surface of the annular slants and a lower surface of the wedge-shaped projections slidably contact with each other so that an external force applied transversely with respect to the outer cap is converted to said upward releasing load and an external force applied downwardly with respect to the outer cap is converted to a detaching force which makes the wedge-shaped projections slip down along the annular slants and detach from the annular grooves, engagemnet holes are formed between the pressing plate and supporting plate.

2. A fuel filler cap comprising: an inner cap of a substantially cylindrical member; and an outer cap of a cover member mounted on the inner cap:

wherein the outer cap includes an upper face portion having a circular shape, a skirt portion integrally extending downward from an outer circumference of the upper face portion, and a wedge-shaped projection having a triangular section formed circumferentially intermittently on an inner face of the skirt portion; wherein a pressing plate has a circular shape, as viewed in a top plan, and has a plurality of engagement blocks protruding downward formed intermittently in the circumferential direction so as to contact in a face-to-face relation with an annular slant of a supporting plate when it is engaged; wherein the inner cap includes the supporting plate having a circular shape, as viewed in a top plan, and having the annular slant continuously formed radially downward by chamfering a peripheral edge of an upper face thereof, a seal ring fitted between a lower face of the supporting plate and an outer face of an inner cap body, and a plurality of annular grooves defined by the annular slant of the supporting plate and by a lower face of the pressing plate engaged with the supporting plate which lacks the engagement blocks to thereby form a sectional shape corresponding to that of the wedge-shaped projection; and wherein the pressing plate and the supporting plate are provided with a plate engagement means for turning integrally in an opening/closing direction of the fuel filler cap and for releasing an engaged state of the pressing plate with the supporting plate, said wedge-shaped projections are fitted to the plurality of annular grooves in which an upper surface of the annular slants and a lower surface of the wedge-shaped projections slidably contact with each other so that an external force applied transversely with respect to the outer cap is converted to said upward releasing load and an external force applied downwardly with respect to the outer cap is converted to a detaching force which makes the wedge-shaped projections slip down along the annular slants and detached from the annular grooves, engagement holes are formed between the pressing plate and supporting plate.

3. A fuel filler cap according to claim 1, wherein the plate engagement means includes a plurality of engaging projections projecting upward from an upper face of the supporting plate and a plurality of engaging holes formed in the pressing plate; and wherein each of the plurality of engaging projections includes a hook portion integrally formed on a top end of a projection body having elasticity and engages the hook portion to a peripheral edge of the engaging hole by being inserted through the engaging hole, so that the engagement between the hook portion and the peripheral edge of the engaging hole is released when a releasing load or greater is applied.

4. A fuel filler cap according to claim 2, wherein the plate engagement means includes a plurality of engaging projections projecting upward from an upper face of the supporting plate and a plurality of engaging holes formed in the pressing plate; and wherein each of the plurality of engaging projections includes a hook portion integrally formed on a top end of a projection body having elasticity and engages the hook portion to a peripheral edge of the engaging hole by being inserted through the engaging hole so that the engagement between the hook portion and the peripheral edge of the engaging hole is released when a releasing load or greater is applied.

5. A fuel filler cap according to claim 1, wherein the plate engagement means includes a plurality of engaging projections projecting downward from a lower face of the pressing plate and a plurality of engaging holes formed in the supporting plate; and wherein each of the plurality of engaging projections includes a hook portion integrally formed on a bottom end of a projection body having elasticity and engages the hook portion to the peripheral edge of the engaging hole by being inserted through the engaging hole, so that the engagement between the hook portion and the peripheral edge of the engaging hole is released when a releasing load or greater is applied.

6. A fuel filler cap according to claim 2, wherein the plate engagement means includes a plurality of engaging projections projecting downward from a lower face of the pressing plate and a plurality of engaging holes formed in the supporting plate; and wherein each of the plurality of engaging projections includes a hook portion integrally formed on a bottom end of a projection body having elasticity and engages the hook portion to the peripheral edge of the engaging hole by being inserted through the engaging hole, so that the engagement between the hook portion and the peripheral edge of the engaging hole is released the when a releasing load or greater is applied.

7. A fuel filler cap according to claim 1, wherein the supporting plate clamps and crushes the seal ring between a lower face thereof and an upper edge of a filler port while the fuel filler cap is secured in the filler port.

8. A fuel filler cap according to claim 2, wherein the supporting plate clamps and crushes the seal ring between a lower face thereof and an upper edge of a filler port while the fuel filler cap is secured in the filler port.

9. A fuel filler cap according to claim 7, wherein the supporting plate includes an annular pendulous portion surrounding the seal ring.

10. A fuel filler cap according to claim 8, wherein the supporting plate includes an annular pendulous portion surrounding the seal ring.

* * * * *